(12) United States Patent  
Williams et al.

(10) Patent No.: US 9,210,228 B2  
(45) Date of Patent: Dec. 8, 2015

(54) ELICITING EVENT-DRIVEN FEEDBACK IN A SOCIAL NETWORK

(71) Applicant: Facebook, Inc., Menlo Park, CA (US)

(72) Inventors: Joshua Williams, Menlo Park, CA (US); Daniel Jeng-Ping Hui, Palo Alto, CA (US); Mao Xue, Fremont, CA (US); Jason Brewer, Kirkland, WA (US); Justin Moore, Brooklyn, NY (US); Keegan Jones, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 363 days.

(21) Appl. No.: 13/711,431

(22) Filed: Dec. 11, 2012

(65) Prior Publication Data

US 2014/0164511 A1     Jun. 12, 2014

(51) Int. Cl.
| | |
|---|---|
| *G06F 15/16* | (2006.01) |
| *H04L 29/08* | (2006.01) |
| *G06Q 50/00* | (2012.01) |

(52) U.S. Cl.
CPC ............... *H04L 67/22* (2013.01); *G06Q 50/01* (2013.01); *H04L 67/306* (2013.01)

(58) Field of Classification Search
CPC .................................. G06Q 50/10; H04L 67/22
See application file for complete search history.

(56) References Cited

U.S. PATENT DOCUMENTS

| | | | | |
|---|---|---|---|---|
| 7,552,365 | B1 * | 6/2009 | Marsh et al. | 714/47.2 |
| 7,657,600 | B2 * | 2/2010 | Auhagen | 709/206 |
| 8,306,624 | B2 * | 11/2012 | Gerber et al. | 607/41 |
| 8,775,351 | B2 * | 7/2014 | Moore et al. | 706/46 |
| 2010/0121707 | A1 * | 5/2010 | Goeldi | 705/14.49 |
| 2010/0131193 | A1 * | 5/2010 | Shnyr | 701/208 |
| 2012/0197709 | A1 * | 8/2012 | Kendall et al. | 705/14.36 |
| 2013/0218640 | A1 * | 8/2013 | Kidder et al. | 705/7.33 |
| 2014/0152666 | A1 * | 6/2014 | Deng et al. | 345/440 |
| 2014/0164511 | A1 * | 6/2014 | Williams et al. | 709/204 |

* cited by examiner

*Primary Examiner* — Lance L Barry  
(74) *Attorney, Agent, or Firm* — Baker Botts L.L.P.

(57) ABSTRACT

Particular embodiments detect events associated with information about activities that a user has engaged in. The activities may be associated with a location or location-agnostic. Based on the received information, the social-networking system sends the user a request for follow-up information after an appropriate time delay. The time delay may vary based on the user activity and the context of the event that triggered the request. After the follow-up information is received, such information is stored in the social-networking system and may be used to determine recommendations, sponsored stories, advertisements, etc. to send to friends of the user. The information may also be used for ranking or filtering recommendations.

30 Claims, 6 Drawing Sheets

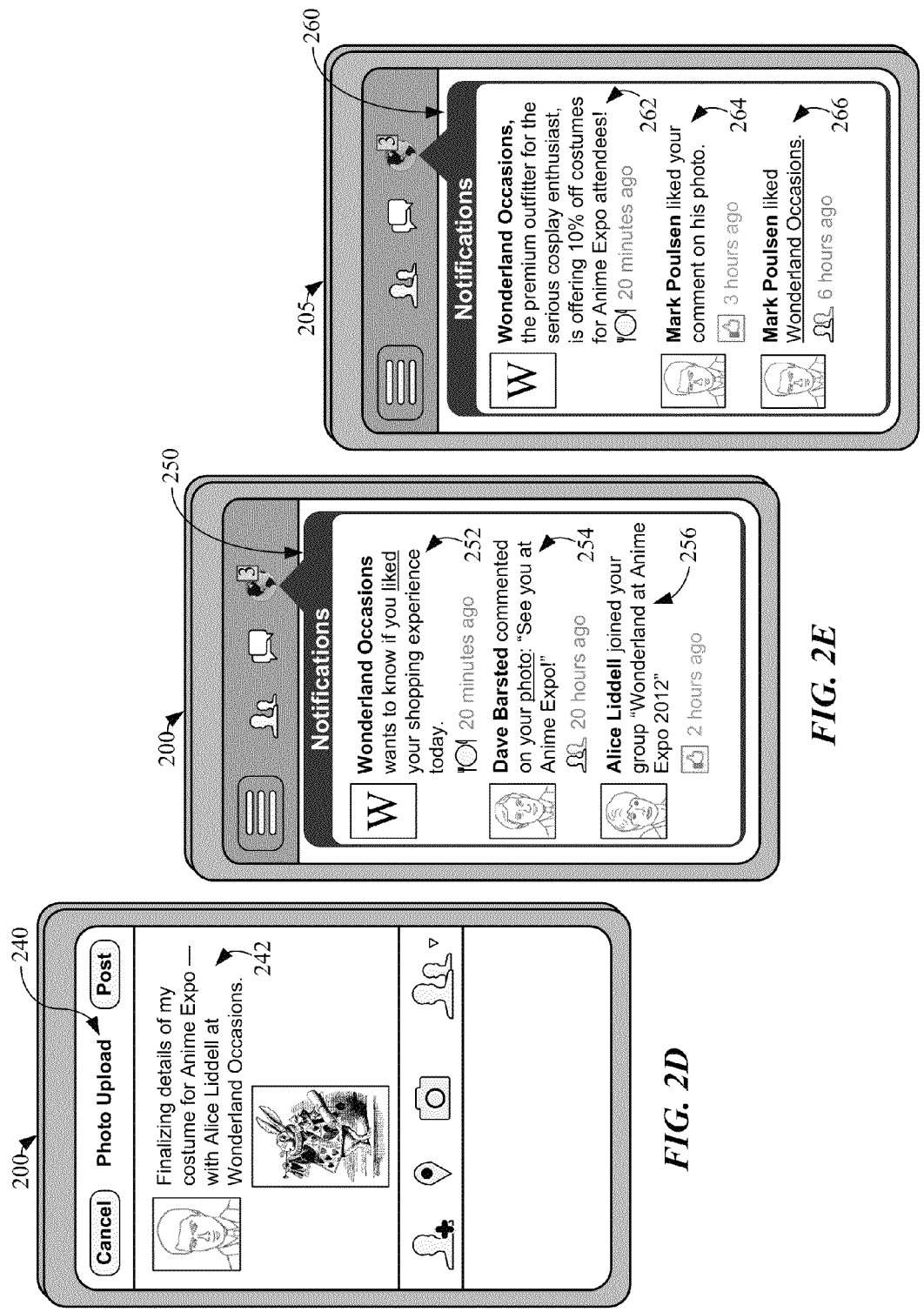

ELICITING EVENT-DRIVEN FEEDBACK IN A SOCIAL NETWORK

TECHNICAL FIELD

This disclosure generally relates to eliciting feedback from users, and particularly, to eliciting information from users for use in conjunction with a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

SUMMARY OF PARTICULAR EMBODIMENTS

Particular embodiments detect events associated with information about activities that a user has engaged in. The activities may be associated with a location or location-agnostic. Based on the received information, the social-networking system sends the user a request for follow-up information after an appropriate time delay. The time delay may vary based on the user activity and the context of the event that triggered the request. After the follow-up information is received, such information is stored in the social-networking system and may be used to determine recommendations, sponsored stories, advertisements, etc. to send to friends of the user. In particular embodiments, the information may be used for ranking or filtering recommendations.

BRIEF DESCRIPTION OF THE DRAWINGS

FIGS. 2A-F illustrate example wireframes of a flow for processing events, requesting additional information, and providing content and/or functionality based on the additional information.

DESCRIPTION OF EXAMPLE EMBODIMENTS

Particular embodiments detect events associated with information about an activity that a user has engaged in. The activity may be associated with a location or it may be location-agnostic. Based on the received information, the social-networking system sends the user a request for follow-up information after an appropriate time delay. The time delay may vary based on a determined reference date and time of the user activity; the delay may also vary based on the context of the event that triggered the request. After the follow-up information is received, such information is stored in the social-networking system and may be used to determine recommendations, sponsored stories, advertisements, etc. to send to friends of the user. In particular embodiments, the information may be used for ranking or filtering recommendations.

Figure 1:
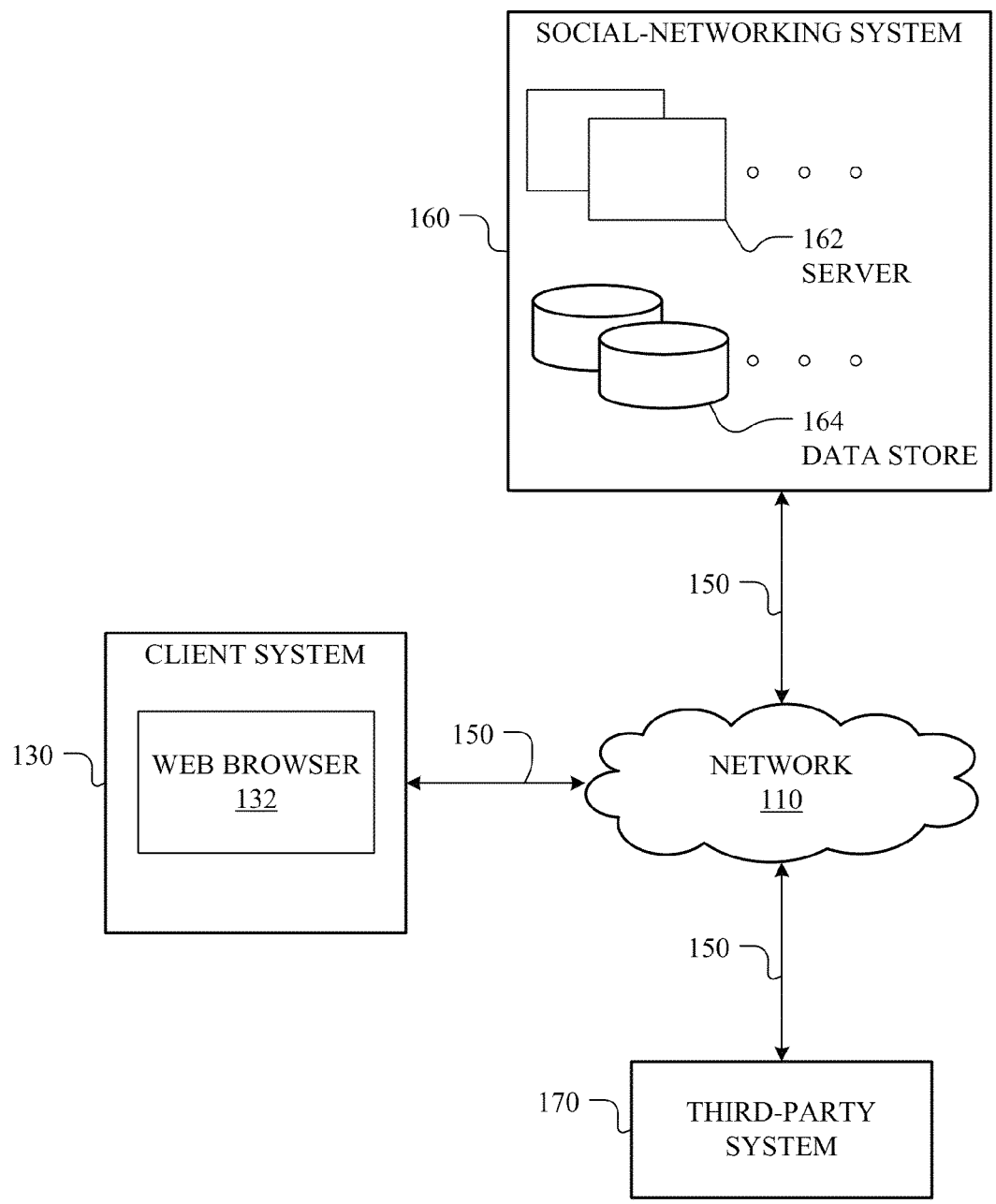
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110. Embodiments of computing devices, including but not limited to computer servers and client devices, are described in greater detail with respect to FIG. 5 in related portions of the specification.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Embodiments of a social graph, including user nodes, concept nodes, and edges, are described in greater detail with respect to FIG. 4 in related portions of the specification. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

FIGS. 2A-C and FIGS. 2D-F are wireframes that illustrate example use cases of functionality to process events, request additional information, and provide functionality based on the additional information. Example computing device 200 is associated with a first social-networking user who triggers an event related to an activity and submits additional information related to the activity. Example computing device 205 is associated with a second social-networking user who may be connected to the first social-networking user in a social graph of the social-networking system.

Figures 2A, 2B, 2C:
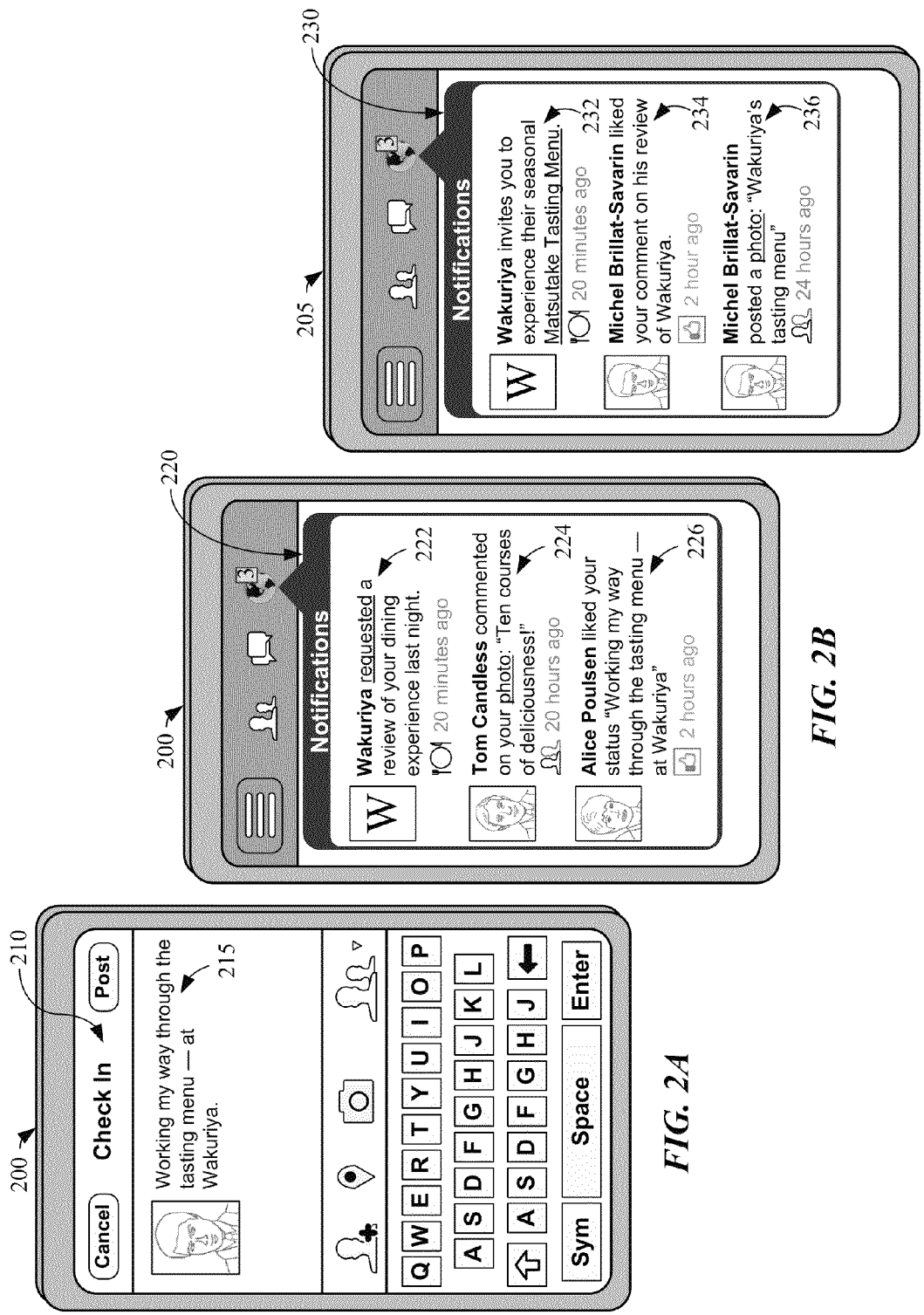

In FIG. 2A, a social-networking user (Michel Brillat-Savarin) associated with example computing device 200 initiates an event by using a check-in interface 210 to provide information about an activity the social-networking user is engaging in (i.e., dining at a restaurant) together with location-based information. The user submits comment 215 along with the check-in event, which is associated with the location of a restaurant (Wakuriya). The social-networking system receives the information and, after determining that the user may have further information about the activity underlying the check-in event, sends the user a request for additional information.

The determination regarding whether the user may have further information about the activity underlying the check-in event may be based at least on the type of activity, as well as whether any information was provided in relation to the check-in event and what was provided. In the example illustrated in FIGS. 2A-C, the social-networking system may determine that the user may have additional information to provide regarding their experience at the restaurant, based on an assumption that the user probably purchased and consumed a meal at the restaurant. Alternatively, the determination may be based on a verification by the restaurant that the social-networking user did in fact purchase and consume a meal at the restaurant. Alternatively, the determination may be based on the fact that the restaurant (the entity associated with the check-in action, or perhaps even some third-party organization, e.g., a restaurant reviewing website) may have requested that additional information be solicited from anyone performing a social action associated with that location.

In FIG. 2B, the example computing device 200 displays a notifications window 220 that includes a request 222 for additional information related to the activity: "a review of your dining experience last night." In the example context illustrated by FIGS. 2A-C, request 222 was scheduled to be sent to the user 12 hours after the check-in event. In this context, the check-in is presumed to be occurring in real time while the user is at the restaurant (thereby providing a reference date and time of the user activity). The timing of request 222 to the user is calculated to schedule delivery of request 222 at an appropriate moment: (1) reasonably promptly after the reference date and time of the user activity, so as to ensure that the user's memory is fresh, (2) but not too early (when the user may still be in the middle of their meal, or may be occupied with other activities later that evening, such as going to a movie or a show).

Although request 222 asks the user to submit a "review" related to the activity (a review of their dining experience), in particular embodiments, request 222 may ask for feedback in different formats, such as, by way of example and not limitation, a rating (e.g., a multi-star rating), a ranking, a response to a multiple-choice question, submission of photos or video that the user may have taken of the activity, a "Like" indication, a recommendation or testimonial, a click on a link that takes the user to an input interface, etc. Furthermore, although request 222 relates to the user's "dining experience," the request may be related to more specific aspects of the activity, such as the actual items consumed or purchased by the user, or to other related aspects, such as the service, décor, convenience of nearby parking or transit, appeal of the neighborhood around the restaurant, etc.

FIG. 2B also illustrates notifications 224 and 226, which were triggered by social graph actions executed by social-networking connections of the social-networking user. In the example shown in FIG. 2B, notification 224 is related to a comment posted by a social-networking connection (Tom Candless) on a photo posted by the social-networking user (Michel Brillat-Savarin) together with his check-in comment 215. Notification 226 is related to a "Like" indication submitted by another social-networking connection (Alice Poulsen) in relation to check-in comment 215. In the example illustrated in FIGS. 2A-C, these actions are stored in the social graph and provide context for delivery of content and/or functionality to social-networking connections of the social-networking user, based on the information submitted by the social-networking user in relation to the event. Example social graphs and related social-networking functions are described in further detail with respect to FIG. 4.

After receiving the request 222 shown in FIG. 2B, the social-networking user (Michel Brillat-Savarin) responds to the request 222 by submitting a review of his dining experience. This information may be stored in association with any related nodes and edges of the social graph. In this example, the review may be stored as a content item associated with the edge (that represents the check-in action) that connects a user node for the social-networking user to a concept node for the restaurant.

After the social-networking user submits the additional information to the social-networking system, the social-networking system may use the additional information to provide recommendations, sponsored stories, advertisements, or other content and/or functionality to social-networking contacts of the social-networking user. In FIG. 2C, example computing device 205, which is associated with a social-networking contact of the social-networking user, displays an advertisement 232 and two notifications 234 and 236. The content of advertisement 232 may be based on the review submitted by the social-networking user (which may be focused on the specific menu selection described in advertisement 232—the seasonal Matsutake Tasting Menu). Furthermore, advertisement 232 is provided to a targeted audience—those social-networking connections of the user who would be most likely to be interested in advertisement 232. The targeted audience may include those social connections of the user who are engaging in social actions (and thereby generating notifications to the user) related to restaurant dining. The delivery of advertisement to the user may also be indicative of the user's own interests. Notifications 234 and 236 reflect that the user of computing device 205 is a social-networking connection of the user of computing device 200 (Michel Brillat-Savarin). The social-networking user associated with computing device 205 may be following the social-networking user associated with computing device 200.

In particular embodiments where the advertisement is related to a particular location, the targeted audience may be selected based on a location-based ranking algorithm that determines, for each user, whether content or functionality related to the particular location should be provided to the user (e.g., in a recommendation, sponsored story, advertisement, or other medium).

In FIG. 2D, a social-networking user (Mark Poulsen) associated with example computing device 200 initiates an event by using a photo uploader interface 240 to provide location-based information. The user submits comment 242 along with the uploaded photo, which is associated with an online costume store (Wonderland Occasions), as well as being associated with another social-networking user (Alice Liddell). The social-networking system receives the information and, after determining that the user may have further information about the activity underlying the event, sends the user a request for additional information.

The determination regarding whether the user may have further information about the activity may be based at least on the type of the activity, as well as whether any information was provided in relation to the photo upload event and what was provided. In the example illustrated in FIGS. 2D-F, the social-networking system may determine that the social-networking user may have additional information to provide regarding their activity (online shopping), based on an assumption that the user probably purchased one or more items while shopping. Alternatively, the determination may be based on a verification by the online store that the social-networking user did in fact purchase one or more items. Alternatively, the determination may be based on the fact that the online store or a third-party organization may have requested that additional information be solicited from anyone performing a social action associated with the website of the online store.

In FIG. 2E, the example computing device 200 displays a notifications window 250 that includes a request 252 related to the activity: whether "you liked your shopping experience today." In the example context illustrated by FIGS. 2D-F, request 252 was scheduled to be sent to the user one hour after the photo upload event. In this context, the photo upload is presumed to be occurring in real time as the user is finalizing his purchase of the costume (thereby providing a reference date and time of the activity). In particular embodiments, metadata or other information accompanying the uploaded photo may also (or alternatively) be analyzed to determine a reference date and time (e.g., looking at a timestamp of the uploaded photo to determine when it was taken). The timing of request 252 to the user is calculated to schedule delivery of request 222 at an appropriate moment: (1) reasonably promptly after the photo upload event, so as to ensure that the user's memory is fresh, (2) but not too early (when the user may still be in the middle of shopping).

Although request 252 asks the user to submit a "review" related to the activity (a review of their shopping experience), in particular embodiments, request 252 may ask for feedback in different formats, such as, by way of example and not limitation, a rating related to the event, for a response to a multiple-choice question, for any photos or video that the user may have taken in relation to the event, for a "Like" indication of the event, for a recommendation or testimonial, for the user to click on a link that takes the user to an input interface, etc. Furthermore, although the request shown in FIG. 2E relates to the user's "shopping experience," the request may be related to more specific aspects, such as the actual items purchased by the user, or to other related aspects, such as the available selection of products, sizes, or colors, the aesthetic appeal of the website, the usability of the website, etc.

FIG. 2E also illustrates notifications 254 and 256, which were triggered by social graph actions executed by social-networking connections of the social-networking user. In the example shown in FIG. 2E, notification 254 is related to a comment posted by a social-networking connection (Dave Barsted) on a photo posted by the social-networking user (Mark Poulsen) together with his check-in comment 215. Notification 226 is related to another social-networking connection (Alice Liddell) who recently joined an affinity group related to the event described in check-in comment 215. In the example illustrated in FIGS. 2D-F, these actions are stored in the social graph and provide context for delivery of content and/or functionality to social-networking connections of the social-networking user, based on the information submitted by the social-networking user in relation to the event. Example social graphs and related social-networking functions are described in further detail with respect to FIG. 4.

After receiving the request 252 shown in FIG. 2E, the social-networking user (Mark Poulsen) responds to the request 252 by indicating that the "Liked" his shopping experience with Wonderland Occasions. This information may be stored in association with any related nodes and edges of the social graph. In this example, the Like indication may be stored in association with an edge that connects a user node for the social-networking user to a concept node for the store.

Although FIG. 2E depicts the request as being delivered in the form of a notification, the request could also be delivered using a newsfeed, an email, a text message, a pop-up window, or any other suitable medium.

After the user submits the additional information to the social-networking system, the social-networking system may use the additional information to provide recommendations, sponsored stories, advertisements, or other content and/or functionality to social-networking contacts of the social-networking user. In FIG. 2F, example computing device 205, which is associated with a social-networking contact of the social-networking user, displays an advertisement 262 and two notifications 264 and 266. The content of advertisement 262 may be based on the Like indication submitted by the social-networking user, as well as any information associated with the event (i.e., attendance at Anime Expo). Furthermore, advertisement 262 is provided to a targeted audience—those social-networking connections of the user who would be most likely to be interested in advertisement 262. The targeted audience may include those social connections of the user who are engaging in social actions (and thereby generating notifications to the user) related to costumes/cosplay and/or related to Anime Expo. Alternatively, the delivery of advertisements to a social-networking user may also be indicative of the user's own interests. Notifications 264 and 266 reflect that the social-networking user associated with computing device 205 is a social-networking connection of the social-networking user associated with computing device 200 (Mark Poulsen). Alternatively, the social-networking user associated with computing device 205 may be following the social-networking user associated with computing device 200.

To target users with advertisements, particular embodiments may utilize one or more systems, components, elements, functions, methods, operations, or steps disclosed in the following, which are all incorporated herein by reference as examples and not by way of limitation: U.S. Patent Appln. Publ. No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Appln. Publ. No. US 2009/0070219, entitled "Targeting Advertisements in a Social Network" and filed 20 Aug. 2008 as U.S. patent application Ser. No. 12/195,321; U.S. Patent Appln. Publ. No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Appln. Publ. No. US 2012/0166532, entitled "Contextually Relevant Affinity Prediction in a Social-Networking System" and filed 23 Dec. 2010 as U.S. patent application Ser. No. 12/978,265.

In particular embodiments, an advertisement 220 may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user). In addition or as an alternative, an advertisement 220 may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Appln. Publ. No. US 2012/0203831, entitled "Sponsored Stories Unit Creation from Organic Activity Stream" and filed 3 Feb. 2012 as U.S. patent application Ser. No. 13/020,745, or U.S. Patent Appln. Publ. No. US 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

Third-party-content objects may be advertisements generated by one or more third parties, such as for example, a business, organization or individual. The third party may provide payment to highlight particular third-party-content objects or "sponsored stories." The third-party-content objects may include an informational-content object, incentive-content object, or a combination thereof. As an example and not by way of limitation, a sponsored story may include an address of a particular business and link to a bar or quick-response (QR) code that provides a discount on a purchase at the particular business. Although this disclosure describes and illustrates a notification with particular content and layout, this disclosure contemplates any notification with any suitable content and layout.

As described above, an advertisement 220 may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement 220 may be requested for display within third-party webpages, social-networking-system webpages, or other pages. An advertisement 220 may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement 220 may be displayed within an application or within a game. An advertisement 220 may be displayed within dedicated pages, requiring the user to interact with or watch the advertisement 220 before the user may access a page, utilize an application, or play a game. The user may, for example view the advertisement 220 through a web browser.

A user may interact with an advertisement 220 in any suitable manner. The user may click or otherwise select the advertisement 220, and the advertisement 220 may direct the user (or a browser or other application being used by the user) to a page associated with the advertisement 220. At the page associated with the advertisement 220, the user may take additional actions, such as purchasing a product or service associated with the advertisement 220, receiving information associated with the advertisement 220, or subscribing to a newsletter associated with the advertisement 220. An advertisement 220 with audio or video may be played by selecting a component of the advertisement 220 (like a "play button"). In particular embodiments, an advertisement 220 may include one or more games, which a user or other application may play in connection with the advertisement 220. An advertisement 220 may include functionality for responding to a poll or question in the advertisement 220.

An advertisement 220 may include social-networking-system functionality that a user may interact with. For example, an advertisement 220 may enable a user to "like" or otherwise endorse the advertisement 220 by selecting an icon or link associated with endorsement. Similarly, a user may share the advertisement 220 with another user (e.g., through social-networking system 160) or RSVP (e.g., through social-networking system 160) to an event associated with the advertisement 220. In addition or as an alternative, an advertisement 220 may include social-networking-system context directed to the user. For example, an advertisement 220 may display information about a friend of the user within social-networking system 160 who has taken an action associated with the subject matter of the advertisement 220.

Social-networking-system functionality or context may be associated with an advertisement 220 in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement 220 before serving the advertisement to a user. Examples of selecting and providing social-networking-system functionality or context with an advertisement are disclosed in U.S. Patent Appln. Publ. No. US 2012/0084160, entitled "Providing Social Endorsements with Online Advertising" and filed 5 Oct. 2010 as U.S. patent application Ser. No. 12/898,662, and in U.S. Patent Appln. Publ. No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement 220 that is associated with social-networking-system functionality or context may cause information about the interaction to be displayed in a profile page of the user in social-networking-system 160.

An advertisement 220 may be presented or otherwise delivered using plug-ins for web browsers or other applications, iframe elements, news feeds, tickers, notifications (which may include, for example, e-mail, Short Message Service (SMS) messages, or other notifications), or other means. An advertisement 220 may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Appln. Publ. No. US 2012/0159635, entitled "Comment Plug-In for Third-Party System" and filed 15 Dec. 2010 as U.S. patent application Ser. No. 12/969,368; U.S. Patent Appln. Publ. No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Appln. Publ. No. US 2008/0040475, entitled "Providing a News Feed Based on User Affinity in a Social Network Environment" and filed 11 Aug. 2006 as U.S. patent application Ser. No. 11/503,093; U.S. Patent Appln. Publ. No. US 2012/0072428, entitled "Action Clustering for News Feeds" and filed 16 Sep. 2010 as U.S. patent application Ser. No. 12/884,010; U.S. Patent Appln. Publ. No. US 2001/0004692, entitled "Gathering Information about Connections in a Social Networking Service" and filed 1 Jul. 2009 as U.S. patent application Ser. No. 12/496,606; U.S. Patent Appln. Publ. No. US 2008/0065701, entitled "Method and System for Tracking Changes to User Content in an Online Social Network" and filed 12 Sep. 2006 as U.S. patent application Ser. No. 11/531,154; U.S. Patent Appln. Publ. No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Appln. Publ. No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Appln. Publ. No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

Figure 3:
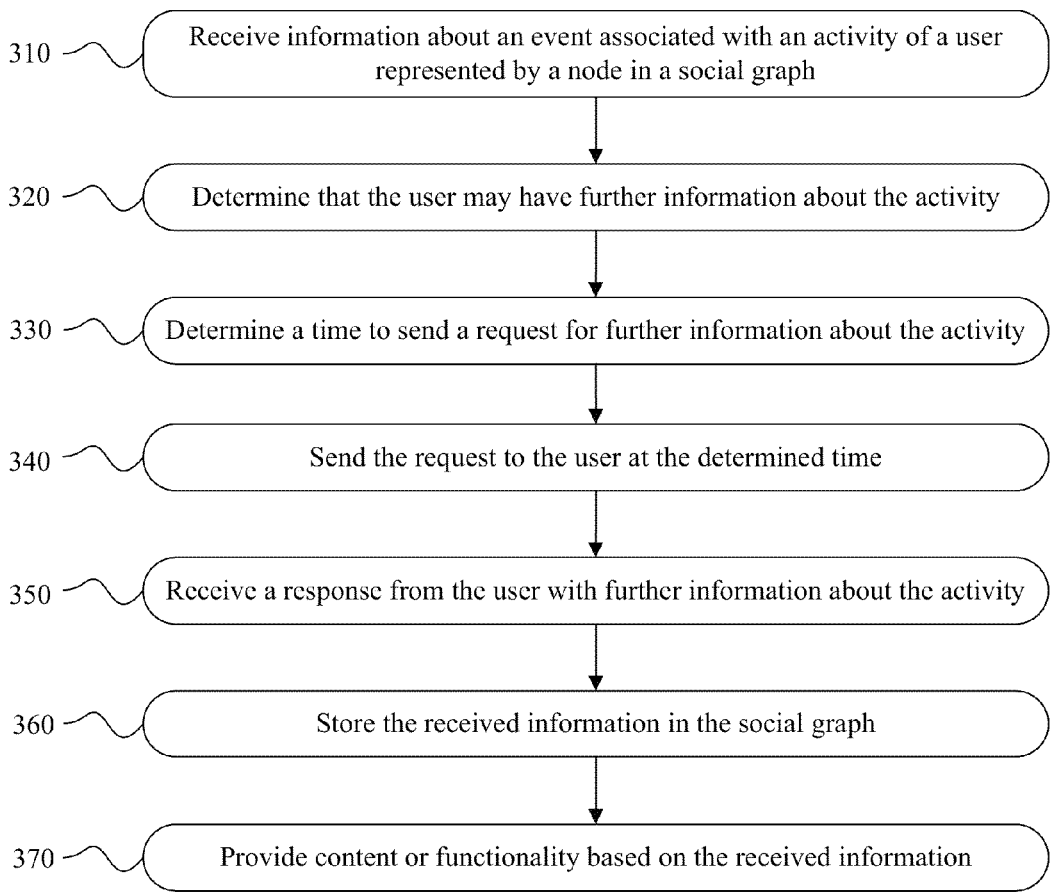
FIG. 3 illustrates an example method for processing events, requesting additional information, and providing content and/or functionality based on the additional information.

FIG. 3 illustrates an example method 300 for processing events, requesting additional information, and providing functionality based on the additional information. In different embodiments, the steps of example method 300 may occur on a computer server, on a client device, or a combination thereof.

In step 310, the social-networking system receives information about an event associated with an activity of a user of the SN. The activity underlying the event may be associated with a location (e.g., checking in to a restaurant, uploading a photo associated with location data, registering for an event, purchasing a product or service at a physical location, or simply providing real-time location data for a user), or it may be location-agnostic (e.g., liking a movie or a product, following or becoming a fan of a web page, an entity, or a person, joining a group, indicating an interest, or interacting with something or someone online). Such information may be received through different active or passive channels: check-in, tagging content with a location, "liking" something, auto-detection via RFID or WiFi, activity logging, data received or retrieved from a third-party system or server, etc. Users may submit such information for themselves; in some embodiments, such information may be submitted on behalf of a user (e.g., being checked in by a friend).

In step 320, the social-networking system determines that the user may have further information about the activity. This determination may be based on a type of the user activity, the event and associated information, or on other relevant factors. In particular embodiments, events and/or user activities may be classified into categories for the purpose of facilitating this determination. The determination may be based on a verification that the SN user completed particular activities (e.g., complete a purchase after placing an item in a shopping cart) or engaged in other related activities (e.g., watched a second episode of a television show after watching a first episode). Alternatively, the determination may be based on the fact that an entity associated with the event, or perhaps even some third-party organization may have requested that additional information be solicited from anyone performing a social action associated with that entity or with that location.

In step 330, the social-networking system determines a time to send a request for additional information. The timing of the request may be based on a number of different factors, such as, by way of example and not limitation, a reference date and time of the user activity, a type of the user activity, a location of the user activity, an object of the user activity, or other information or metadata associated with the user activity. The timing of the request is calculated to schedule delivery of the request to the user at an appropriate moment: (1) reasonably promptly after the reference date and time, so as to ensure that the user's memory of the activity is fresh, (2) but not too early (when the user may still be in the middle of the activity, or may be occupied with other activities).

In step 340, the social-networking system sends the user the request for additional information related to the event at the determined time. The time delay may vary based on the context of the event that triggered the request. For the purpose of calculating the time delay, the request-triggering event may be a user action or a user-related event detected by the SN (e.g., check-in or photo upload or status update) or an action about which the SN was notified by a third-party system (e.g., a purchase or upload of content). Alternatively, the request-triggering event may be an action or event described in or otherwise associated with For example, as shown in the example use case illustrated in FIGS. 2A-C, if a user submitted a check-in for a restaurant, the SN may send the user a message requesting a review or rating of the restaurant 12 hours later or the next day. Alternatively, the request may be for a review or rating of a particular dish at the restaurant that the user ordered. In another example, as shown in the example use case illustrated in FIGS. 2D-F, if a user tags an uploaded photo with the location of a local clothing store, the SN may send the user a message an hour after the tag event, asking if the user wants to "Like" the store. Alternatively, the message may be sent an hour after the upload event, if the store can be identified from the photo (e.g., by performing image analysis on the photo). Alternatively, the message may ask if the user wants to "Like" the items that they purchased.

In another example, if the user completes a purchase of an on-demand movie for a particular showtime, the SN may send the user a message requesting a review or rating of the movie within 30 minutes of the scheduled end of the movie showing at that particular showtime.

In another example, if the user downloads a single-/multi-player online game onto their mobile device, after detecting that the user has played the game in single-player mode for several days, the SN may send the user a message asking the user if they would be interested in playing the game in multi-player mode. If the user indicates that they would, the SN may request further information from the user, such as asking the user if they want to join particular groups of players, or asking the user if they want to broadcast an invitation to their social-networking connections to play the online game with the user.

In another example, if the user organizes a speed-dating event where each participant at the speed-dating event meets another participant for five minutes before moving on to the next participant, the SN may send each participant an immediate message at the end of each five-minute session requesting a rating or comments related to the person they just met. In a further example, if a participant rates another participant highly, the SN may asked the participant if they are willing to release their contact information to the other participant after the event.

In another example, at a convention or trade show, RFID or NFC transmitters may detect attendees as they approach each booth and notify the SN. Since attendees at a convention or trade show have a tendency to wander around and may spend anywhere from one second to fifteen minutes or even longer at a booth, the SN may send each participant an immediate message upon receiving the notification requesting a rating or comments or response to a multiple-choice question related to the booth or station. In the situation where an attendee merely passed by a booth but failed to linger, such an immediate message may help to elicit negative feedback that can help explain why someone was not interested in a particular booth. In another example, the SN may send such a message only if the attendee is detected as lingering at the booth for longer than some designated time period.

The time delay may vary based on a type of node associated with the location, based on a type of content associated with the location, based on the method/action by which the information was received, etc.

In step 350, the social-networking system receives the additional information. The additional information may be received by way of an interface provided by the SN (e.g., "Like indication") or another method (e.g., email or third-party online interface).

In step 360, the social-networking system stores the additional information in the SN. In particular embodiments, the additional information may be stored in association with the user and also in association with another user or a concept. For example, if the user responded to a request for a restaurant rating and/or review, the user's response may be stored in the social graph in association with the user's node and also in association with a concept node associated with the restaurant.

In step 370, the social-networking system uses the additional information together with the information associated with the event to provide recommendations, sponsored stories, advertisements, and other content and/or functionality to social-networking connections of the user. In particular embodiments, the information may be used for ranking or filtering recommendations.

The social-networking system may receive advertisements from an advertiser for delivery to users of a social-networking system. The advertisement may be received from a vendor or retailer. The advertisement may comprise any type of content, for example and not by way of limitation: text, graphics, video, audio, other multimedia content. The advertisement may also be linked to a promotion associated with the vendor or retailer, and the promotion may be described or alluded to in the content (e.g., "10% off," "buy one, get one ½ half off," "click before the link expires in the next 10 seconds," "refer two friends for 20% off your next purchase").

The social-networking system 160 may receive third-party-content objects from one or more third parties, such as for example, a business, organization or individual. As used herein, third-party-content objects include any suitable content object generated by a third party in contrast to content objects generated by user nodes of the social graph. The third-party-content objects may be advertisement that includes informational-content objects, such as movie show times, movie reviews, sale information, restaurant menus, etc., as well as incentive-content objects, such as for example coupons, discount tickets, gift certificates, etc. In particular embodiments, third-party-content objects may be a combination of informational-content and incentive-content objects. In particular embodiments, a third party may provide payment to highlight particular third-party-content objects or "sponsored stories". The sponsored stories may be presented to the user in response to activity initiated by one or more user nodes in the social graph of the user. As an example and not by way of limitation, when a user node in the social graph "checks in" at a particular location, a third-party-content object associated with the particular location may be presented to user. As another example, a third-party-content object may be presented to the user in response to a user node in the social graph sharing content from an application that has paid for the sponsored story.

The social-networking system may determine relevance scores for advertisements with respect to the user based on the assessment of notifications described above and/or any specified criteria for a target audience. The relevance score may be based at least in part on location value, interest value, connection value, and time value. Third-party-content objects may be assigned to categories, locations, or delivery-time ranges by social-networking system 160. As an example and not by way of limitation, categories may be established by the social-networking system 160 that reflect interests of users of social-networking system 160. In particular embodiments, social-networking system 160 may assign multiple categories to each third-party-content object. In particular embodiments, a location may be assigned to third-party-content objects. A location may be general, such as for example a city, or specific, such as for example a particular street name, intersection, or GPS coordinate. One or more locations may be assigned to each third-party content object. In particular embodiments, a delivery-time range may be assigned to a third-party-content object. The delivery-time range may reflect appropriate hours for the third-party-content object. As an example and not by way of limitation, if the third-party-content object is a coupon for a particular business that is open only in the morning, the range for the notification likely would correspond to the operating hours of the particular business, or some other useful range related to the operating hours, e.g. fifteen minutes before opening to thirty minutes before closing.

Social-networking system 160 may determine a time value for a third-party-content object based on whether the current time is within the delivery-time range for the third-party-content object. In particular embodiments, social-networking system 160 determines a location value for a third-party-content object based on the proximity between the third-party-content object location and a current location associated with client device 130. As an example and not by way of limitation, a coupon for a discount on a movie ticket at a particular movie theater chain may apply to all theaters in the chain, or a particular theater.

In particular embodiments, the social-networking system 160 determines a connection value for a third-party-content object based at least in part on the user nodes and connections of the social graph associated with the third-party-content object, as described above. As an example and not by way of limitation, a connection associated with the third-party-content object may include information or a coupon for a business that a user node of the social is frequenting, e.g. a user node of the social graph is at the frozen yogurt store that the incentive applies to. In particular embodiments, the processing module of the content engine may modify the connection values by applying one or more weighting factors. As an example and not by way of limitation, a degree of separation between user nodes of the social graph and the user may affect the connection value. As another example, the type of connection between the user and the user nodes of the social graph user may affect the connection value. As an example and not by way of limitation, "friendship"-type connections may be associated with a higher connection value than a "work colleague"-type connection. Although this disclosure describes a relevance score based on particular types of values, this disclosure contemplates a relevance score based on any suitable types of values.

In particular embodiments, social-networking system 160 may determine a relevance score based at least in part on whether the category or categories assigned to the third-party-content object coincide with the category or categories associated with the user's interests. In particular embodiments, the relevance score may be based on information associated with an object in the social graph of the user, information associated with an action taken with respect to the social graph, or information related to the user that is received at social-networking system 160 from a third party. As an example and not by way of limitation, an object in the social graph may include a user or concept profile, or information associated with a user node that is connected to the user. As another example, an action may include friending/unfriending a user node, "liking" a content object, becoming a fan of a third party, joining a group or community of users on social-networking system 160, or visiting a website of a third party. As another example, third-party information may include information of activity of the user or purchases by the user on a third-party website. Although this disclosure describes a relevance score based on particular information or actions associated with the user, this disclosure contemplates a relevance score based on any suitable information or actions associated with the user. Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

In particular embodiments, the relevance score is based at least in part to an affinity for the user with respect to the object of the social graph, as described above. As an example and not by way of limitation, affinity for past, present, or future content may be determined by the processing module of the content engine based on user activities, activities of the user nodes of the social graph, or associated connections, or any combination thereof. Any type of variable may be considered when determining affinity to weight the aggregated consolidated data. In particular embodiments, affinity may be calculated using a weighted set of predictor functions. Predictor functions predict whether the user will perform a particular action. The predictor functions may predict any number of actions, which may be within or outside of the social networking system. In particular embodiments, the processing module ranks the aggregated consolidated data by relevance score to dynamically generate content personalized for the users of social-networking system 160. In particular embodiments, the processing module of the content engine may combine the location value, interest value, connection value, and time value to determine the relevance score for the third-party content object with respect to the user. The dynamically generated content personalized for the users of social-networking system 160 may be stored in a data store described above.

Determination and use of measures of affinity are discussed in further detail in the following U.S. patent applications, all of which are incorporated herein by reference: U.S. patent application Ser. No. 11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009 and titled "Selection and Presentation of Related Social Networking System Content and Advertisements;" U.S. patent application Ser. No. 13/247,825, filed on 28 Sep. 2011 and titled "Instantaneous Recommendation of Social Interactions in a Social Networking System;" U.S. patent application Ser. No. 12/976,755, filed on 22 Dec. 2010 and titled "Pricing Relevant Notifications Provided to a User Based on Location and Social Information;" U.S. patent application Ser. No. 12/978,265, filed on 23 Dec. 2010 and titled "Contextually Relevant Affinity Prediction in a Social Networking System;" and U.S. patent application Ser. No. 13/632,869, filed on 1 Oct. 2012 and titled "Mobile Device-Related Measures of Affinity."

The social-networking system may select advertisement(s) for delivery to the user based on the relevance scores. The processing module of the content engine may select particular third-party-content objects (e.g., advertisements) based on the relevance score for the third-party content object with respect to the user.

In particular embodiments, the social-networking system may utilize a location-based ranking algorithm to assess the additional information together with the information associated with the event. The algorithm may comprise a linear model that computes a value for each of a set of factors, then applies weights to the factors to come up with an overall ranking score. In particular embodiments, certain factors may be evaluated on a binary basis, while others are assessed along a gamut (e.g., linear, exponential, bell curve). Factors may include any aspect of a particular location, including both physical aspects and virtual aspects, such as, by way of example and not limitation:

- the proximity of the user's current location (or another specified location) to the particular location;
- the current time of day, day of the week, or other date-related information, and any available information about hours of operation for the particular location;
- whether the particular location is on or near a particular route;
- amenities of the location (e.g., do they have a bathroom? do other people think the bathroom is well-kept? do they have an elevator? do they accept payment by credit card?);
- whether the particular location is represented within the social graph (e.g., as a standalone concept node, or as information associated with another node), including the degree of completeness of a profile page or homepage associated with the particular location;
- whether information related to the particular location is available on third-party websites (e.g., websites for the Michelin Guide, Zagat, TimeOut), including the degree of completeness of the page on the third-party website that is associated with the particular location;
- availability of online images of the particular location (e.g., on the particular location's social-networking homepage, on a website associated with the particular location, or on third-party websites);
- whether there are social recommendations available for the particular location (e.g., did a social-networking friend of the user check in there? or indicate that they liked or disliked it? or recommend it?)—this may involved factoring in:
  - aspects of the relationship between the user and the friend (e.g., degree of separation in the social graph, duration of the connection, frequency of communications, topics discussed, shared interests, shared groups, etc.), or aspects of the relationship of the user to the particular location (e.g., is the user a tourist or a local? is the user visiting for business or pleasure? if the user is a tourist, are they a regular visitor?)—use social recommendations submitted by social graph users who had the same purpose while in the area;

profile of other visitors to the particular location (how well do their profiles match the user's profile?)

any search query submitted by the user (e.g., all "Cinemark movie theaters within 5 miles of my current location");

categorizations applied to the particular location (e.g., "hotel," "restaurant," "resort," "spa," "banquet facilities," "meeting rooms"), as well as any order, scoring, or ranking applied to the categorizations;

verification of existence and measure of popularity (are there a lot of "check-ins"? a lot of "Likes"? are there significantly more "Likes" than "check-ins" (indicating that it may not be an actual physical location)? are there a lot of historical check-ins, but none within the past nine months?).

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
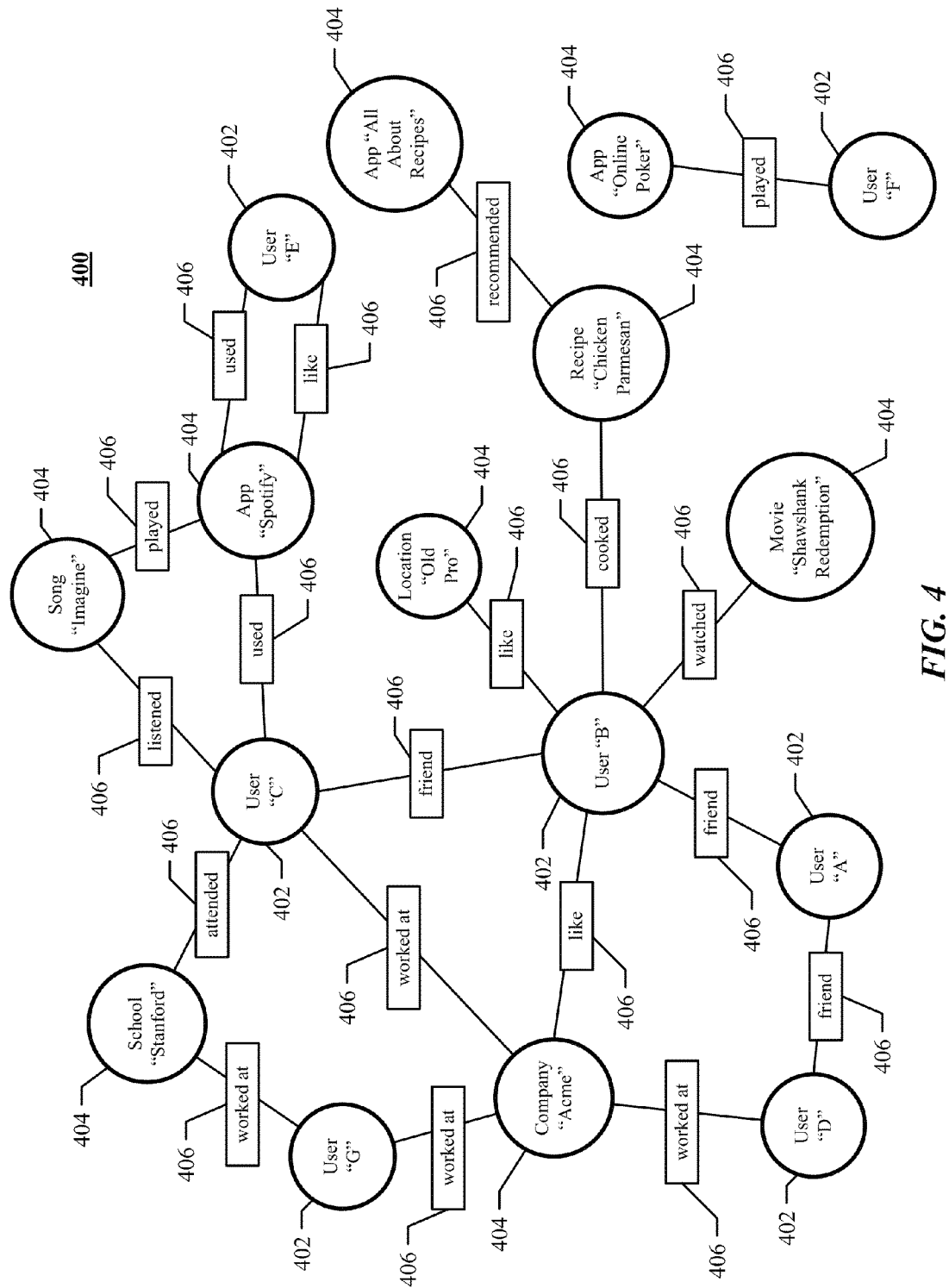
FIG. 4 illustrates an example social graph.

FIG. 4 illustrates example social graph 400. In particular embodiments, social-networking system 160 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 160, client system 130, or third-party system 170 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 160. In particular embodiments, a user node 402 may be associated with information provided by a user or information gathered by various systems, including social-networking system 160.

As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 160 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 160 may create an edge 406 between a user node 402 and a concept node 404 in social graph 400. As an example and not by way of limitation, a user viewing a concept-profile page (such as, for example, by using a web browser or a special-purpose application hosted by the user's client system 130) may indicate that he or she likes the concept represented by the concept node 404 by clicking or selecting a "Like" icon, which may cause the user's client system 130 to send to social-networking system 160 a message indicating the user's liking of the concept associated with the concept-profile page. In response to the message, social-networking system 160 may create an edge 406 between user node 402 associated with the user and concept node 404, as illustrated by "like" edge 406 between the user and concept node 404. In particular embodiments, social-networking system 160 may store an edge 406 in one or more data stores. In particular embodiments, an edge 406 may be automatically formed by social-networking system 160 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
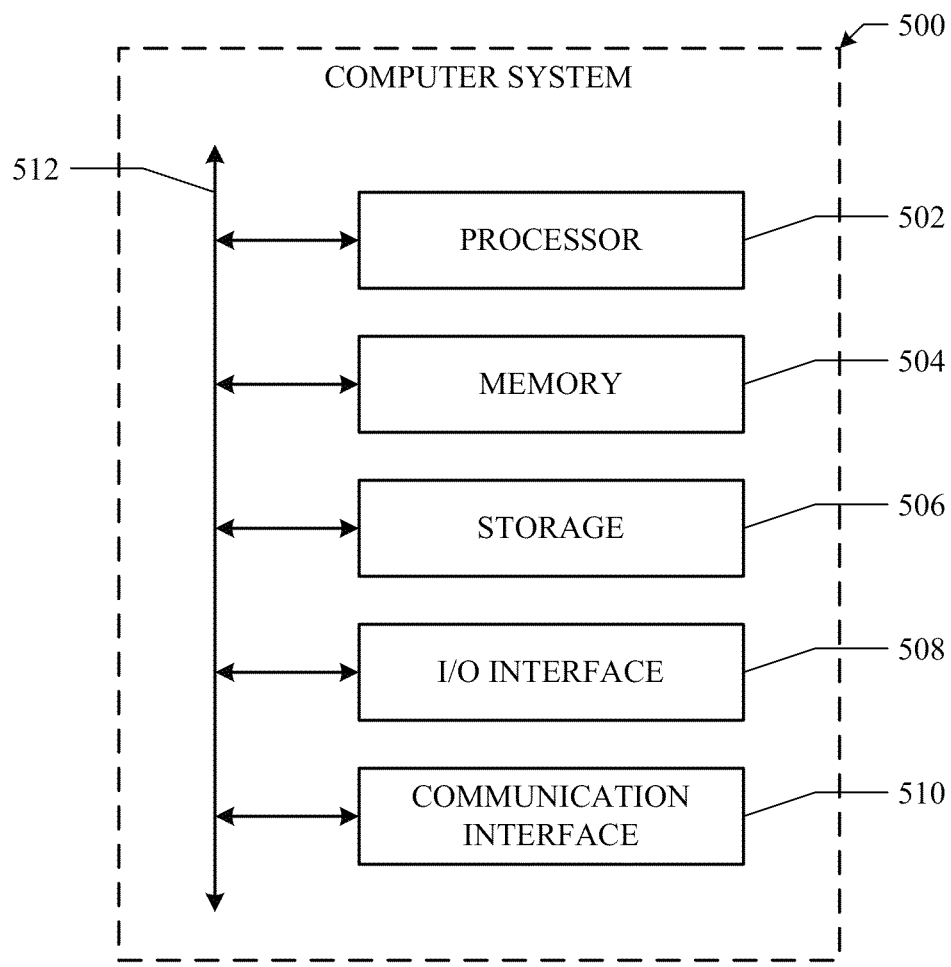
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by one or more processors associated with one or more computer servers, information about an activity of a first user, the information being received in association with an event triggered by the first user, the first user being associated with a user node in a social graph;
   determining, by the one or more processors, based on the information about the activity and the triggered event, that the first user may be able to provide further information about the activity;
   determining, by the one or more processors, a reference date and time of the activity of the first user;
   determining, by the one or more processors, based on the reference date and time, a time to send the first user a request for further information about the activity;
   sending, by the one or more processors, the request to the first user at the determined time; and
   receiving, by the one or more processors, a response from the first user with the further information about the activity.

2. The method of claim 1, wherein determination of the time to send the first user the request is further based on a type of the event or information associated with the event.

3. The method of claim 1, further comprising:
storing the further information about the activity in association with one or more elements of the social graph.

4. The method of claim 1, wherein the information about the activity of the first user was received from a third-party system.

5. The method of claim 1, wherein the request for further information about the activity comprises a request to perform an action associated with the social graph.

6. The method of claim 1, further comprising:
providing, by the one or more processors, information based on the further information about the activity.

7. The method of claim 6, wherein the information provided based on the further information about the activity of the first user comprises an advertisement, sponsored story, recommendation, or suggestion.

8. The method of claim 6, wherein the information provided based on the further information about the activity of the first user is ranked based on the further information, using a location-based ranking algorithm.

9. The method of claim 6, wherein the information provided based on the further information about the activity of the first user is provided to a user represented by a node in the social graph or an entity represented by a node in the social graph.

10. The method of claim 6, wherein the information provided based on the further information about the activity of the first user is provided to a third party associated with the activity of the first user.

11. One or more computer-readable non-transitory storage media embodying software that is operable when executed to:
receive, by one or more processors associated with one or more computer servers, information about an activity of a first user, the information being received in association with an event triggered by the first user, the first user being associated with a user node in a social graph;
determine, by the one or more processors, based on the information about the activity and the triggered event, that the first user may be able to provide further information about the activity;
determine, by the one or more processors, a reference date and time of the activity of the first user;
determine, by the one or more processors, based on the reference date and time, a time to send the first user a request for further information about the activity;
send, by the one or more processors, the request to the first user at the determined time; and
receive, by the one or more processors, a response from the first user with the further information about the activity.

12. The media of claim 11,
wherein determination of the time to send the first user the request is further based on a type of the event or information associated with the event.

13. The media of claim 11, wherein the software is further operable when executed to:
store the further information about the activity in association with one or more elements of the social graph.

14. The media of claim 11, wherein the information about the activity of the first user was received from a third-party system.

15. The media of claim 11, wherein the request for further information about the activity comprises a request to perform an action associated with the social graph.

16. The media of claim 11, wherein the software is further operable when executed to provide information based on the further information about the activity.

17. The media of claim 16, wherein the information provided based on the further information about the activity of the first user comprises an advertisement, sponsored story, recommendation, or suggestion.

18. The media of claim 16, wherein the information provided based on the further information about the activity of the first user is ranked based on the further information, using a location-based ranking algorithm.

19. The media of claim 16, wherein the information provided based on the further information about the activity of the first user is provided to a user represented by a node in the social graph or an entity represented by a node in the social graph.

20. The media of claim 16, wherein the information provided based on the further information about the activity of the first user is provided to a third party associated with the activity of the first user.

21. A system comprising:
one or more processors associated with one or more computer servers associated with a social networking system; and
a memory coupled to the processors comprising instructions executable by the processors, the processors being operable when executing the instructions to:
receive information about an activity of a first user, the information being received in association with an event triggered by the first user, the first user being associated with a user node in a social graph;
determine, based on the information about the activity and the triggered event, that the first user may be able to provide further information about the activity;
determine a reference date and time of the activity of the first user;
determine, based on the reference date and time, a time to send the first user a request for further information about the activity;
send the request to the first user at the determined time; and
receive a response from the first user with the further information about the activity.

22. The system of claim 21,
wherein determination of the time to send the first user the request is further based on a type of the event or information associated with the event.

23. The system of claim 21, wherein the processors are further operable when executing the instructions to:
store the further information about the activity in association with one or more elements of the social graph.

24. The system of claim 21, wherein the information about the activity of the first user was received from a third-party system.

25. The system of claim 21, wherein the request for further information about the activity comprises a request to perform an action associated with the social graph.

26. The system of claim 21, wherein the processors are further operable when executing the instructions to provide information based on the further information about the activity.

27. The system of claim 26, wherein the information provided based on the further information about the activity of the first user comprises an advertisement, sponsored story, recommendation, or suggestion.

28. The system of claim 26, wherein the information provided based on the further information about the activity of the first user is ranked based on the further information, using a location-based ranking algorithm.

29. The system of claim 26, wherein the information provided based on the further information about the activity of the first user is provided to a user represented by a node in the social graph or an entity represented by a node in the social graph.

30. The system of claim 26, wherein the information provided based on the further information about the activity of the first user is provided to a third party associated with the activity of the first user.

* * * * *